(12) United States Patent
Gross et al.

(10) Patent No.: US 11,945,385 B2
(45) Date of Patent: Apr. 2, 2024

(54) ENERGY ABSORPTION DEVICE

(71) Applicant: Bayerische Motoren Werke Aktiengesellschaft, Munich (DE)

(72) Inventors: Martin Gross, Haimhausen (DE); Arne Koehler, Pliening (DE); Tamara Manske, Munich (DE); Christian Muselmann, Munich (DE); Mazdak Novine, Andechs (DE); Tim Rudolph, Munich (DE); Manuel Schroeder, Oberhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 363 days.

(21) Appl. No.: 17/593,955

(22) PCT Filed: Mar. 2, 2020

(86) PCT No.: PCT/EP2020/055450
§ 371 (c)(1),
(2) Date: Sep. 29, 2021

(87) PCT Pub. No.: WO2020/200604
PCT Pub. Date: Oct. 8, 2020

(65) Prior Publication Data
US 2022/0161746 A1    May 26, 2022

(30) Foreign Application Priority Data
Apr. 3, 2019 (DE) ............... 10 2019 108 742.2

(51) Int. Cl.
*B60R 19/18* (2006.01)
(52) U.S. Cl.
CPC ........ *B60R 19/18* (2013.01); *B60R 2019/186* (2013.01); *B60R 2019/1866* (2013.01); *B60R 2019/1873* (2013.01)

(58) Field of Classification Search
CPC ... B60R 19/18; B60R 19/186; B60R 19/1866; B60R 19/1873; B60R 2019/186; B60R 2019/1866; B60R 2019/1873
(Continued)

(56) References Cited

U.S. PATENT DOCUMENTS 6,755,452 B2 *   6/2004   Cate ................... F16F 7/003
                                                    293/133
9,205,794 B1    12/2015   Farooq et al.
(Continued)

FOREIGN PATENT DOCUMENTS

CN         1564763 A      1/2005
CN       105172722 A     12/2015
(Continued)

OTHER PUBLICATIONS

International Search Report (PCT/ISA/210) issued in PCT Application No. PCT/EP2020/055450 dated May 19, 2020 with English translation (four (4) pages).
(Continued)

*Primary Examiner* — Dennis H Pedder
(74) *Attorney, Agent, or Firm* — Crowell & Moring LLP

(57) ABSTRACT

An energy absorption device for a bumper of a motor vehicle has a first deformation element on the front side of the bumper. The first deformation element is a foam shaped part which extends over the width of the bumper and has a density of from 20 to 50 g/l. At least one second deformation element, with a density which is at least 50 g/l higher than the first deformation element, is inserted into the first deformation element.

14 Claims, 4 Drawing Sheets

(58) Field of Classification Search
USPC .......................................... 293/102, 120–122
See application file for complete search history.

(56) References Cited

U.S. PATENT DOCUMENTS

| | | |
|---|---|---|
| 2003/0034658 A1 | 2/2003 | Cate et al. |
| 2004/0130167 A1 | 7/2004 | Mori et al. |
| 2004/0174024 A1 | 9/2004 | Murata et al. |
| 2005/0218672 A1 | 10/2005 | Mustafa et al. |
| 2009/0322107 A1 | 12/2009 | Takahashi et al. |
| 2013/0257070 A1 | 10/2013 | Ebara et al. |
| 2015/0367796 A1 | 12/2015 | Farooq et al. |

FOREIGN PATENT DOCUMENTS

| | | |
|---|---|---|
| CN | 105799625 A | 7/2016 |
| CN | 106427846 A | 2/2017 |
| DE | 44 32 082 A1 | 3/1996 |
| DE | 699 04 140 T2 | 8/2003 |
| DE | 60 2004 006 327 T2 | 1/2008 |
| DE | 10 2006 041 095 A1 | 3/2008 |
| DE | 10 2015 209 746 A1 | 12/2016 |
| EP | 1 046 546 A1 | 10/2000 |
| EP | 1 433 665 A2 | 6/2004 |
| EP | 1 577 168 A2 | 9/2005 |
| JP | 60-143161 A | 7/1985 |

OTHER PUBLICATIONS

English translation of Chinese-language Office Action issued in Chinese Application No. 202080024027.8 dated May 11, 2023 (9 pages).

* cited by examiner

ENERGY ABSORPTION DEVICE

BACKGROUND AND SUMMARY OF THE INVENTION

The invention relates to an energy absorption device for a bumper of a vehicle, in particular a motor vehicle.

DE 10 2015 209 746 A1 discloses an energy absorption device for a bumper of a motor vehicle, which energy absorption device is arranged on the front side of a bumper, which is in the form of a crossmember. The known energy absorption device is composed of a first deformation element (referred to as a "second deformation element" in the terminology of DE 10 2015 209 746 A1) which forms a "basic body", and local second deformation elements (referred to as a "third deformation element" in the terminology of DE 10 2015 209 746 A1). The second deformation elements are preferably arranged in the extension of the longitudinal member of the motor vehicle.

It is an object of the invention to develop the known energy absorption device.

This object is achieved by an energy absorption device having the features of the independent claims.

It is a core idea of the invention to provide an energy absorption device of an assembled foam component, the constituent parts of which have significantly different densities and thus significantly different stiffnesses.

According to the invention, the foam material of the first deformation element has a density which is at least 50 g/l lower than that of the second deformation element ("density gap"). In one configuration of the invention, the foam material of the first deformation element has a density which is at least 60 g/l lower than that of the second deformation element. In another configuration of the invention, the foam material of the first deformation element has a density which is at least 70 g/l lower than that of the second deformation element.

Furthermore, according to the invention, the density of the foam material of the first deformation element is 20 to 50 g/l ("density 1"). In one configuration of the invention, the density of the foam material of the first deformation element is 25 to 40 g/l. In another configuration of the invention, the density of the foam material of the first deformation element is 25 to 35 g/l.

Furthermore, according to the invention, the density of the foam material of the second deformation element is 80 to 250 g/l ("density 2"). In one configuration of the invention, the density of the foam material of the second deformation element is 90 to 250 g/l. In another configuration of the invention, the density of the foam material of the second deformation element is 100 to 250 g/l.

A tolerance of +/−10% is placed on all specifications relating to the density values.

The invention includes any desired combinations of the "density gap" with the "density 1" and the "density 2", that is to say pairings of the first and the second deformation element where there is an established difference in terms of the density of the foam materials of the two deformation elements.

In principle, a larger absolute "density gap" is expedient when the "density 1" has a value at the upper limit of the range specified, compared to a value of the "density 1" at the lower limit of the range specified. In both cases, this results in a more comparatively relative "density gap".

The Applicant has determined the ranges of values specified for the densities of the foam materials of the first and the second deformation element using novel approaches in comprehensive experiments, in which the goal was to resolve sometimes contradictory requirements between pedestrian protection and "low speed crash".

The first deformation element is fundamentally based on the requirements of pedestrian protection in terms of its energy absorption behavior.

In order in addition to account for a higher introduction of load in the event of what is known as a "low speed crash" (collision speed<20 km/h), in the case of the energy absorption device according to the invention at least one second deformation element with a greater stiffness is provided. In this way, the energy absorption device according to the invention as a whole meets the requirements of pedestrian protection and also of the "low speed crash".

The "low speed crash" is a parking knock or a head-on collision accident at low speed (or low residual speed after prior braking), for example. Collisions of this type are generally below the trigger threshold of the airbag system for protecting the occupants of the vehicle. The damage occurring to the vehicle in the event of a "low speed crash" is what is referred to as minor damage, in the case of which there is no damage to the load-bearing structure of the vehicle. Nevertheless, for limiting the damage to the vehicle it is significant that as much collision energy as possible is dissipated in the energy absorption device. This reduces the repair costs. This makes it possible to obtain a more favorable insurance premium from the vehicle insurer.

The invention is distinguished in that the second deformation element forms a local stiffening of the first deformation element. In this respect, the first deformation element may form a "basic body", on which or in which is received the second deformation element. The second deformation element may be inserted or placed on at a position or some positions on the first deformation element.

The position and/or the size of the second deformation element depend(s) on the configuration of the vehicle, in particular on the configuration of the bumper and/or the first deformation element. The energy absorption device is usually designed in tests with test bodies (for example: barriers, pendulums). For example, the position and/or size of the second deformation element are/is dimensioned such that there is a sufficient geometric overlap with the test bodies normally used, with at the same time maximum stretching of the first deformation element. In this way, the system as a whole meets the requirements of pedestrian protection and also of the "low speed crash".

The invention thus resolves the conflict of goals between pedestrian protection and "low speed crash", taking into account the requirements of the installation space available in the vehicle and the vehicle proportions prescribed from the vehicle package.

In this respect, in the "low speed crash" the intrusion of the test body through the second deformation element is reduced to a minimum in order to minimize the vehicle damage, while at the same time the requirements of pedestrian protection are met by the targeted dissipation of energy in the first deformation element.

The second deformation element has no appreciable influence on pedestrian protection owing to its positioning on or in the first deformation element and/or owing to its shaping and/or its size.

In one configuration of the invention, the second deformation element is dimensioned such that it does not influence the sensing of the impact of a pedestrian, for example by a pressure hose. This sensing serves to trigger actuators for an active front flap, for example.

In the case of different vehicle models of a vehicle manufacturer and/or variants of a vehicle model and/or national designs of a vehicle model, the invention makes it possible in a simple manner for individual adaptation to be achieved by virtue of corresponding pairings of the first and second deformation elements. The deformation elements of the individual vehicle variants may differ in this respect in terms of their density and/or their geometry (width, height, thickness), for example, and similarly in terms of the arrangement of the second deformation element on or in the first deformation element.

The invention offers the possibility of reducing the size of the installation space required in the longitudinal direction of the vehicle, between the bumper cladding and the front side of the bumper, without adversely affecting the pedestrian protection and/or the requirements of the "low speed crash". This reduces the "overhang" of the body upstream of the front axle, having a positive effect on the external appearance of the vehicle. As already mentioned above, the increased energy absorption of the second deformation element makes it possible to achieve a lower degree of intrusion caused by the crash (and therefore a reduced damage pattern on the vehicle), with advantages in terms of the insurance premium of the vehicle. In addition, less free deformation space is required behind the bumper, for example for a cooler arranged behind the bumper.

The second deformation element has a smaller extent in the vehicle transverse direction and/or in the vehicle height direction and/or in the vehicle longitudinal direction compared to the first deformation element. The second deformation element thus constitutes a local stiffening within the energy absorption device.

In a preferred configuration of the invention, at least two second deformation elements are provided on or in the right and the left portion of the first deformation element, the second deformation elements being arranged mirror-symmetrically in relation to a longitudinal center plane of the vehicle, for example.

The second deformation elements are arranged in the region of the extension of front longitudinal members of the vehicle, for example. These front longitudinal members are also referred to as motor supports and accommodate the bumper at their front ends. The front longitudinal members have in their front region what are referred to as "defoboxes" for absorbing energy in the event of a crash. The level of force above which deformation of the second deformation elements occurs is for example somewhat below the level of force above which deformation of the "defoboxes" occurs. This configuration achieves a compression of the second deformation element, possibly through to it becoming blocked, before the "defobox" is activated.

It goes without saying that it is also possible for more than two second deformation elements to be provided. In addition or as an alternative to the pairwise arrangement of the second deformation elements, it is also possible to provide a single second deformation element, which is preferably arranged centrally on or in the first deformation element.

The first deformation element may extend continuously over at least nearly the entire width of the bumper.

In a preferred configuration of the invention, the second deformation element is inserted in the first deformation element.

To this end, at least one cutout may advantageously be provided in the first deformation element, in which cutout the second deformation element is accommodated. In this way, the first deformation element has a lower material thickness in the region of the inserted second deformation element.

In one advantageous configuration of the invention, the second deformation element is arranged on the front side of the first deformation element, that is to say adjacent to the adjoining bumper cladding.

As an alternative, the second deformation element may also be inserted in the rear side of the first deformation element, adjacent to the adjoining bumper. In the case of energy absorption devices composed of "multiple-element foam components" (see the definition below), the second deformation element may also be arranged inside the first deformation element, that is to say may be surrounded on all sides by material of the first deformation element. In these cases, the impact of a pedestrian can be sensed by a device in the region of the front side of the first deformation element, for example.

In this respect, the second deformation element may have a cuboid-like or pyramid-like configuration. As an alternative, the second deformation element may have a strip-shaped design. In both configurations, the second deformation element may be arranged above and/or below and/or on the front side of and/or on the rear side of and/or inside the first deformation element.

When it has a strip-shaped form, the second deformation element may extend over part of the width extent of the first deformation element. In one configuration of the invention, the second deformation element extends over a substantial part of the width of the first deformation element. The second deformation element preferably has a height extent which is smaller than the height extent of the first deformation element. The strip-shaped second deformation element may be accommodated in a "trough-shaped" cutout of the first deformation element. As an alternative, the strip-shaped second deformation element may be placed areally on the front side and/or on the rear side of the first deformation element.

In addition to the configuration of the first deformation element as a "basic body", the first and second deformation elements may also be arranged next to one another or one on top of another in an alternating manner directly on the bumper. In this respect, the volume fraction of the second deformation element is lower than the volume fraction of the first deformation element, in order to account for the requirement of pedestrian protection.

In one advantageous configuration of the invention, the first deformation element protrudes with respect to the second deformation element, with the result that in the event of a collision first of all the first deformation element is compressed. As already set out above, the first deformation element may, however, also be arranged "behind" or "in" the second deformation element.

It is common to all of the embodiments mentioned above, however, that the first deformation element is compressed first of all, before the second deformation element is compressed thereafter, owing to the lower density of the first deformation element.

All of the positional references used above relate to the installation position of an energy absorption device according to the invention in a vehicle.

The energy absorption device according to the invention, which is composed of the "basic body" of the first deformation element and the second deformation element, which is inserted therein or connected thereto, may be produced in different ways. Firstly, this may be a question of "constructed energy absorption devices" with foam components which are produced separately and then joined together. Secondly, the energy absorption device may consist of inseparably interconnected foam constituent parts ("multiple-element foam components").

In the case of a "constructed energy absorption device", the first and the second deformation element are produced separately. In a preferred configuration of the invention, the first deformation element has a cutout for accommodating the second deformation element. The second deformation element is inserted in the cutout in the first deformation element and secured in place in the first deformation element by a form-fitting connection, for example. The form-fitting connection may be effected for example by inserting the second deformation element ("hard foam component") into the first deformation element, for example into an undercut or along oblique faces of the first deformation element.

As an alternative or in addition, the second deformation element may be connected to the first deformation element by adhesive bonding.

As an alternative or in addition, additional elements for securing the second deformation element in place on the first deformation element may be provided, such as for example clips.

During the production of a "multiple-element foam component", a prefabricated second deformation element ("hard foam component"), for example, is placed into a molding machine. After this, the material of the first deformation element is injected into the molding machine and the second deformation element is encapsulated by foaming as a result.

It is further possible for a "multiple-element foam component" to be produced for example without a pre-molded "hard foam component" in a molding machine with slides, by successively filling in the two different plastics materials.

In the description above, the singular is fundamentally used in connection with the "second deformation element", in the sense that it is "at least one second deformation element" here.

The invention also relates to a motor vehicle having an energy absorption device according to the invention.

Possible exemplary embodiments of the invention are illustrated in the drawing and will be explained in more detail below.

DETAILED DESCRIPTION OF THE DRAWINGS

Figure 1:
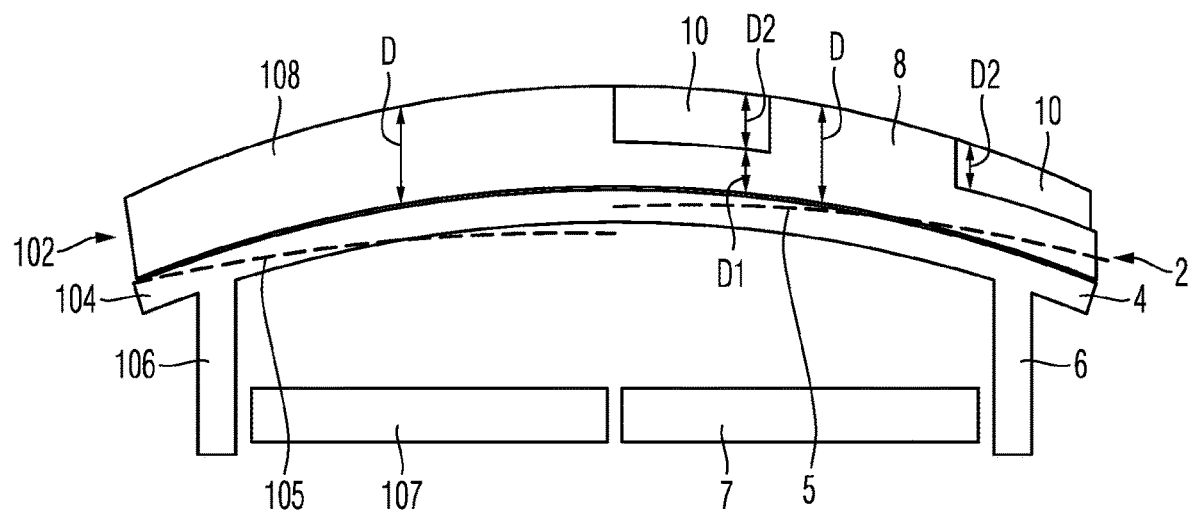
FIG. 1 shows a schematic illustration of a bumper arrangement with an energy absorption device according to the prior art (left half of FIG. 1) and an energy absorption device according to an embodiment of the invention (right half of FIG. 1).

FIG. 1 shows the structure of an energy absorption device according to the prior art compared to an energy absorption device according to an embodiment of the invention.

A known bumper arrangement, denoted in its entirety by 102, for a motor vehicle has a bumper 104 (bumper crossmember) which runs in the transverse direction of the motor vehicle and is attached to the load-bearing structure of the motor vehicle via a left longitudinal member 106 and a right longitudinal member, which is not illustrated. The bumper 104 is provided with an energy absorption device, which is formed by a first deformation element 108 arranged at the front of the bumper 104. A front edge of a front flap of the motor vehicle is denoted by 105. A cooler 107, among other things, is provided at the rear of the bumper arrangement 102 counter to the direction of travel. The first deformation element 108 has a thickness D of 80 mm, for example. The thickness D may remain approximately the same in the transverse direction of the motor vehicle or may vary in the transverse direction of the motor vehicle.

The bumper arrangement according to an embodiment of the invention, denoted in its entirety by 2, for a motor vehicle likewise has a bumper 4 (bumper crossmember) which runs in the transverse direction of the motor vehicle and is attached to the load-bearing structure of the motor vehicle via a left longitudinal member, which is not illustrated, and a right longitudinal member 6. An energy absorption device with a first deformation element 8 is arranged on the front side of the bumper 4. One outer and one inner second deformation element 10 are inserted in the first deformation element 8 on each side of the vehicle (only the right side is illustrated). A front edge of the front flap of the motor vehicle is denoted by 5. A cooler 7, among other things, is provided behind the bumper arrangement 2.

The first deformation element 8 consists of a foam material, preferably a plastics material, for example EPP or PU, for example with a density which is uniform in the transverse, longitudinal and height direction of the motor vehicle of approximately 30 g/l, for example. The second deformation elements 10 likewise consist of a foam material, preferably a plastics material, for example EPP or PU. The density of the second deformation elements 10 is significantly higher than the density of the first deformation element 8 and is approximately 100 g/l, for example. Correspondingly, the stiffness of the second deformation elements 10 is also significantly greater than the stiffness of the first deformation element 8. As a result, the second deformation elements 10 are what are known as "hard foam parts".

The foam material of the first and/or the second deformation element is formed by a particle foam, for example, such as EPP. A PUR foam, for example, similarly comes into consideration.

The first deformation element 8 has a thickness D of 80 mm, for example, in the portions in which no second deformation element 10 is provided. In the regions which have a second deformation element 10, the thickness D1 of the first deformation element 8 is 40 mm, for example. The thickness D2 of the second deformation element 10 is 40 mm, for example. What is to be understood by "thickness" here is the extent in the longitudinal direction of the motor vehicle.

For example, the second deformation element 10 locally significantly reduces the penetration depth of the object with which a collision occurs during a standardized test procedure (for example a pendulum impact test) by virtue of the local stiffening by the second deformation element 10. The reduced penetration depth makes it possible for the front edge 5 of the front flap of the motor vehicle to be drawn further forward than is the case for a motor vehicle according to the prior art.

Figure 2:
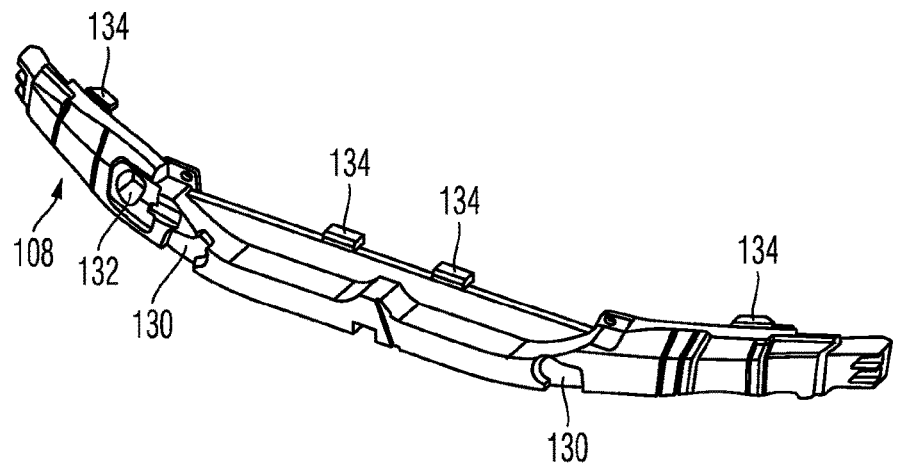
FIG. 2 shows a perspective illustration of a first deformation element for a bumper, according to the prior art.

FIG. 2 shows a first deformation element 108 according to the prior art, which is in the form of a foam molding. The outer contour of the first deformation element 108 is matched to the inner side of a bumper cladding, which is not illustrated, resulting in the "jagged" outer contour illustrated in FIG. 2. For example, the deformation element 108 has cutouts 130 for PDC sensors, and a cutout 132 for a towing eye. The rear side, not visible in FIG. 2, of the deformation element 108 is molded in a manner equivalent to the corresponding bumper 104, which is not illustrated, in the sense of a large-area contact surface. A plurality of securing arms 134, by means of which the first deformation element 108 can be arranged in a form-fitting manner on the bumper 104, can also be seen.

Figure 3:
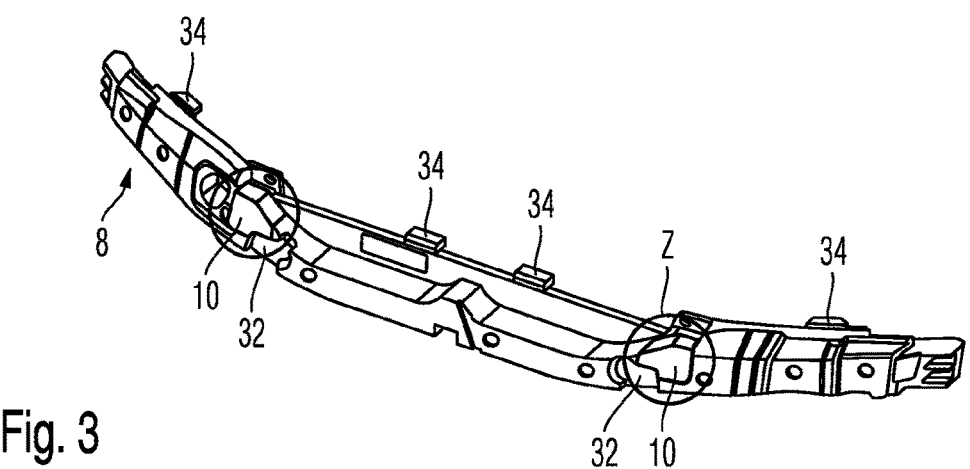
FIG. 3 shows an illustration, corresponding to FIG. 2, of a first deformation element according to an embodiment of the invention with inserted second deformation elements.
Figure 4:
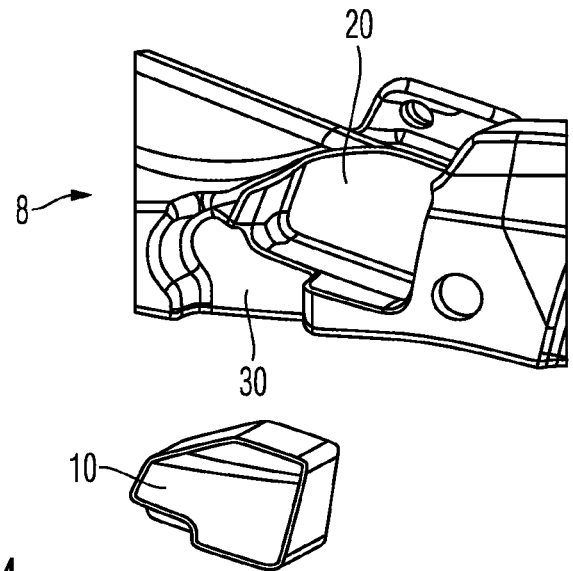
FIG. 4 shows an enlarged illustration of the detail Z of FIG. 3, with a second deformation element illustrated separately.

FIG. 3 shows a first deformation element 8 according to an embodiment of the invention, which is identical to the first deformation element 108 according to FIG. 2 except for a right and a left cutout 20 (illustrated in FIG. 4). The cutouts 20 serve according to the invention for accommodating a right and a left second deformation element 10. Moreover, the first deformation element 8 has cutouts 30 and 32, which correspond to the first deformation element 108, and securing arms 34.

FIG. 4 is an enlarged illustration of the significant difference between the known deformation element 108 and the deformation element 8 according to the invention. The second deformation element 10 is in the form of a hard foam body, for example, which can be clipped into the cutout 20 in the first deformation element 8. The first deformation element 8 is designed as a foam molding, for example.

Figure 5:
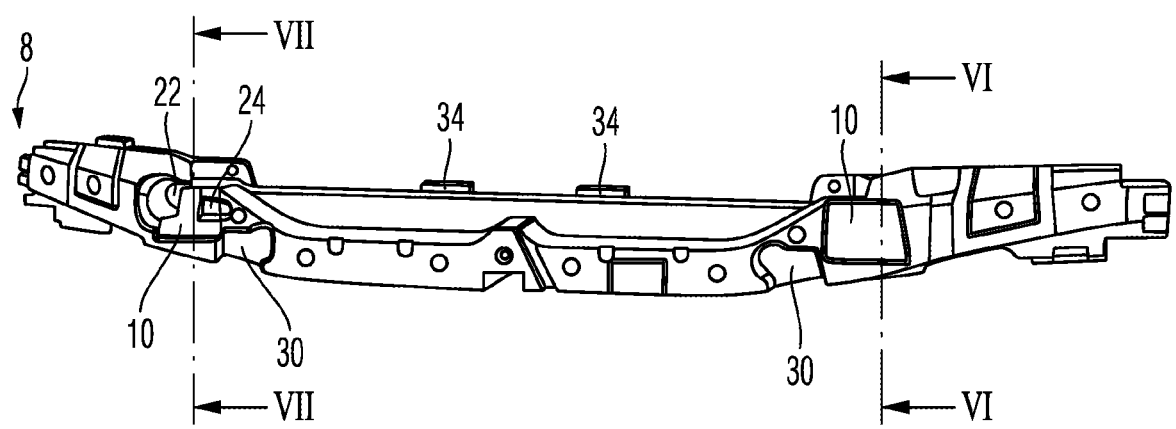
FIG. 5 shows a second exemplary embodiment of the invention in a perspective illustration.

FIG. 5 shows a second exemplary embodiment of the invention. The deformation elements 8 and 10 of the exemplary embodiment according to FIG. 5 are matched to the design of a bumper cladding for an equipment variant, for example. Components which are the same and have the same effect are provided with the same reference signs as in the first exemplary embodiment.

As a departure from the first exemplary embodiment, according to FIG. 5 the right and the left second deformation element 10 have geometrically different configurations. By contrast to the left second deformation element 10, the right second deformation element 10 has on the outside a cutout 22 for a fastening bushing for a towing eye which can be screwed in. In addition, a cutout 24 for a cover for covering the opening for the towing eye is provided on the front side of the right second deformation element 10.

Figure 6:
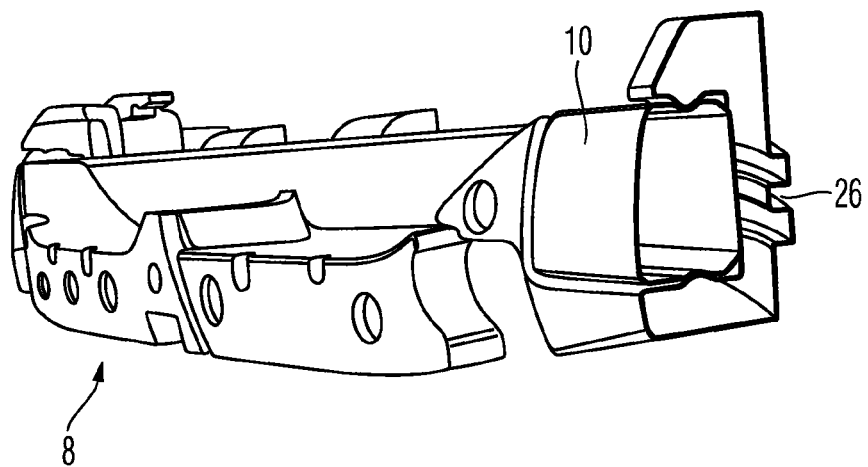
FIG. 6 shows a perspective sectional illustration in accordance with the sectional profile line VI-VI in FIG. 5.
Figure 7:
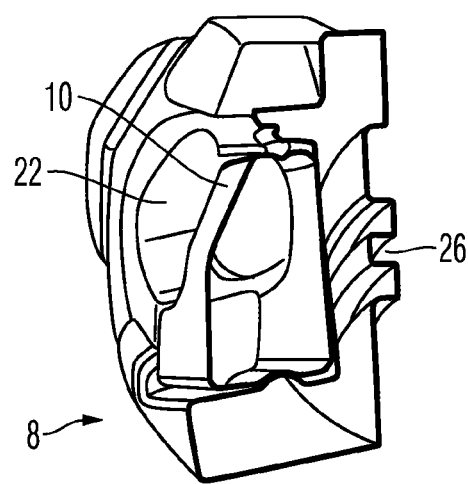
FIG. 7 shows a perspective sectional illustration in accordance with the sectional profile line VII-VII in FIG. 5.

FIGS. 6 and 7 show the two deformation elements 10 in enlarged sectional illustrations. Here, a channel 26 for accommodating a fluid hose, which is not illustrated, for sensing an impact on the bumper 4 is illustrated on the rear side of the first deformation element 8.

Figure 8:
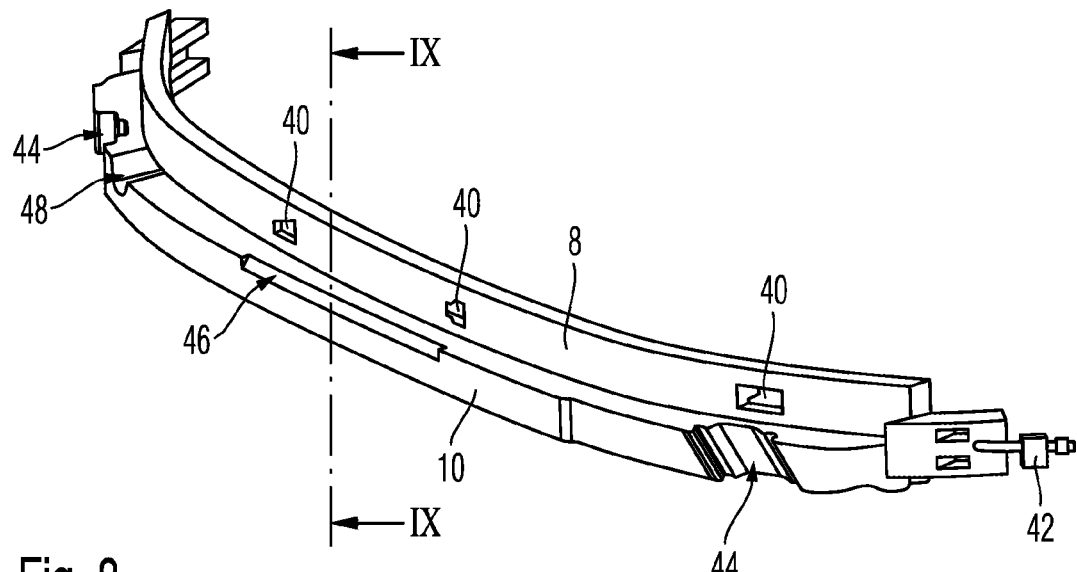
FIG. 8 shows a third exemplary embodiment of the invention in a perspective illustration.
Figure 9:
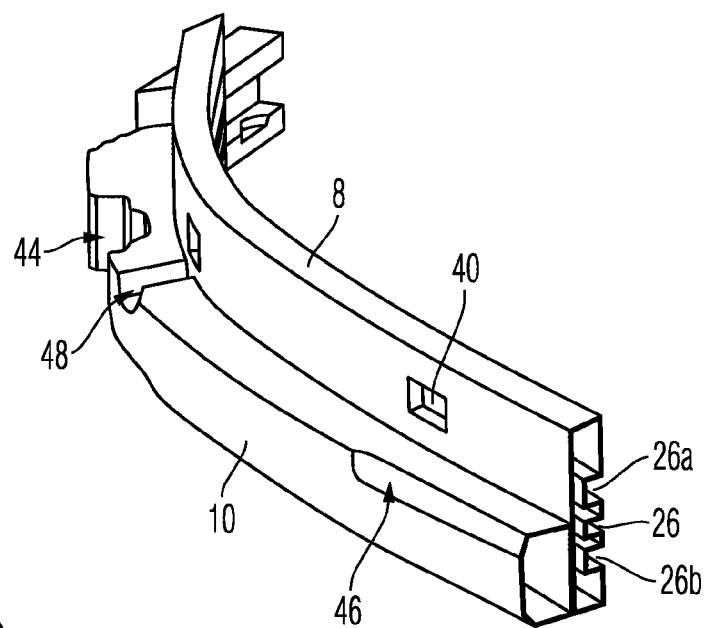
FIG. 9 shows a perspective sectional illustration in accordance with the sectional profile line IX-IX in FIG. 8.

FIGS. 8 and 9 show an energy absorption device with a first and a second deformation element 8 and 10, respectively. The two deformation elements 8 and 10 extend over a substantial part of the width of a bumper (bumper cross-member), which is not illustrated. In this respect, the first deformation element 8 is designed to make contact with the bumper over its entire surface area. The first deformation element 8 has cutouts 40, into which fastening elements (for example assembly plugs) for attachment to the bumper can be inserted. A channel 26 for accommodating a fluid hose 42 is provided on the rear side, facing the bumper, of the first deformation element 8. The fluid hose 42 serves to sense an impact on the bumper. The adjacent channels 26a and 26b in the first deformation element 8 allow unrestricted deformation of the central channel 26, in order that the fluid hose 42 can optimally deform in the event of a pedestrian impact and thus can sense the impact as best as possible.

The second deformation element 10 has a strip-shaped form and is arranged in the lower region of the front side of the first deformation element 8, that is to say is arranged upstream of the first deformation element 8. It is connected to the first deformation element 8 by adhesive bonding, for example. In this respect, the second deformation element 10 projects beyond the first deformation element 8 at each lateral end portion. The height of the second deformation element 10 is approximately half the height of the first deformation element 8. The second deformation element 10 has a thickness which is somewhat larger than that of the first deformation element 8. Cutouts 44, 46 and 48 are provided on the front side and/or the top side of the second deformation element 10, for example to pass through a towing eye or to provide a free space for PDC sensors.

The first deformation element 8 has a density of for example approximately 30 g/l, while the second deformation element 10 has a density of for example 130 g/l.

The illustration in FIG. 9 is based on a CAD sectional illustration. For clarification purposes, it should be noted that the two deformation elements 8 and 10 are of course solid materials.

The invention can be summarized as follows: an energy absorption device for a bumper 4 of a motor vehicle has a first deformation element 8 on the front side of the bumper 4. The first deformation element 8 is a foam molding, which reaches over the width of the bumper 4 and has a density of 20 to 50 g/l. At least one second deformation element 10 which has a density which is at least 50 g/l higher than that of the first deformation element is inserted in the first deformation element 8.

LIST OF REFERENCE SIGNS

2 Bumper arrangement
4 Bumper
5 Front edge of the front flap
6 Longitudinal member
7 Cooler
8 First deformation element
10 Second deformation element
20 Cutout
22 Cutout
24 Cutout
26 Channel
26a Channel
26b Channel
30 Cutout
32 Cutout
34 Securing arm
40 Cutout
42 Pressure hose
44 Cutout
46 Cutout
48 Cutout
102 Bumper arrangement
104 Bumper 105 Front edge of the front flap
106 Longitudinal member
107 Cooler
108 First deformation element
130 Cutout
132 Cutout
134 Securing arm
D Thickness
D1 Thickness
D2 Thickness
Z Detail

What is claimed is:

1. An energy absorption device for a bumper of a vehicle, comprising:
    a first deformation element, which extends substantially over an entire width of the bumper; and
    at least one second deformation element, which is arranged on the first deformation element, in an exterior recess of the first deformation element, wherein
    the first and the second deformation element are made of foam material with different densities,
    the foam material of the first deformation element has a density which is at least 50 g/l lower than that of the foam material of the second deformation element,
    the density of the foam material of the first deformation element is 20 to 50 g/l and the density of the foam material of the second deformation element is 80 to 250 g/l, and
    the second deformation element is arranged adjacent to the first deformation element in a longitudinal direction of the vehicle whereby, in an event of a collision, the first deformation element is compressed before the second deformation element is compressed.

2. The energy absorption device according to claim 1, wherein
    the foam material of the first deformation element has a density which is at least 60 g/l lower than that of the foam material of the second deformation element.

3. The energy absorption device according to claim 1, wherein
    the foam material of the first deformation element has a density which is at least 70 g/l lower than that of the foam material of the second deformation element.

4. The energy absorption device according to claim 1, wherein
    the density of the foam material of the second deformation element is 90 to 250 g/l.

5. The energy absorption device according to claim 1, wherein
    the density of the foam material of the second deformation element (10) is 100 to 250 g/l.

6. The energy absorption device according to claim 1, wherein
    the second deformation element is inserted in the first deformation element.

7. The energy absorption device according to claim 6, wherein
    the first deformation element has a cutout for accommodating the second deformation element.

8. The energy absorption device according to claim 1, wherein
    the second deformation element is arranged on a front side of the first deformation element.

9. The energy absorption device according to claim 1, wherein
    the second deformation element has a cuboid-shape.

10. The energy absorption device according to claim 1, wherein
    the second deformation element has a strip-shaped design.

11. The energy absorption device according to claim 10, wherein
    the second deformation element extends over a substantial part of the width extent of the first deformation element.

12. The energy absorption device according to claim 1, wherein
    the second deformation element is connected to the first deformation element by a form fit and/or adhesive bonding.

13. The energy absorption device according to claim 1, wherein
    the first deformation element and the second deformation element are produced in the form of a multiple-element foam component.

14. A motor vehicle comprising an energy absorption device according to claim 1.

* * * * *